United States Patent [19]

Herget et al.

[11] Patent Number: 5,048,344
[45] Date of Patent: Sep. 17, 1991

[54] BOREHOLE STRAIN MONITOR FOR SOFT ROCK

[75] Inventors: Gerhard H. Herget, Kanata; Franz Kapeller, Ottawa, both of Canada

[73] Assignee: Her Majesty the Queen in right of Canada, Ontario, Canada

[21] Appl. No.: 426,072

[22] Filed: Oct. 23, 1989

[30] Foreign Application Priority Data

Apr. 7, 1989 [CA] Canada ................................. 596032

[51] Int. Cl.$^5$ ............................................... G01B 7/16
[52] U.S. Cl. ................................................... 73/784
[58] Field of Search ...................... 73/778, 784, 862.41, 73/862.59, DIG. 1, 704; 166/206, 216

[56] References Cited

U.S. PATENT DOCUMENTS 1,046,793 12/1912 Jackson .
2,040,874 5/1936 Pack .
2,306,137 12/1942 Pabst et al. .
2,805,482 9/1957 Schonstedt .
2,969,677 1/1961 Lewis .
3,466,926 9/1969 Ruppeneit et al. .................... 73/784
3,470,401 9/1969 Hetzel .
3,675,474 7/1972 Browne et al. .
3,889,525 6/1975 Bailey .
3,914,992 10/1975 Babcock .
3,977,242 8/1976 Brown .
4,159,641 7/1979 Hawkes .
4,663,975 5/1987 Parkinson .
4,858,472 8/1989 Herget et al. ......................... 73/784

FOREIGN PATENT DOCUMENTS 1240851 9/1988 Canada .
2337884 6/1975 Fed. Rep. of Germany ... 73/DIG. 1

Primary Examiner—Robert Raevis
Attorney, Agent, or Firm—Jones, Tullar & Cooper

[57] ABSTRACT

A borehole strain monitor for soft rock consisting of a sensing unit, an installation/retrieval provision and a read-out unit. The sensing unit has a U-shaped yoke and is fitted with a vibrating wire transducer. A magnetically coupled variable frequency oscillator determines the point of resonance for the tensioned wire. The resonant frequency is measured with a frequency counter. The sensing unit is used, typically, in boreholes between two and six inches in diameter. The unit is firmly seated in the borehole by means of a pad at one side and a positively guided wedge at the other to bring the unit in contact with diametrically opposed portions of the borehole wall.

10 Claims, 3 Drawing Sheets

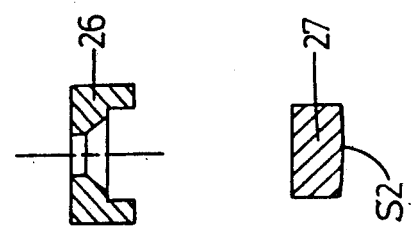
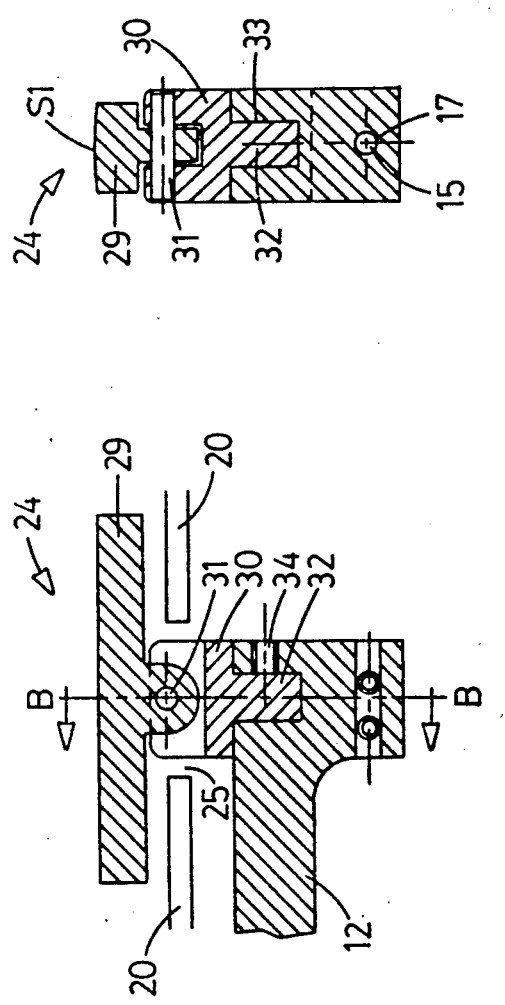

BOREHOLE STRAIN MONITOR FOR SOFT ROCK

BACKGROUND OF THE INVENTION

1. Field of the Invention

The present invention relates to a radial borehole strain monitoring system for soft rock and, in particular, a fully self-contained and highly stable strain or deformation monitoring instrument of the vibrating wire strain meter type for monitoring radial borehole deformation in weak rock.

2. Prior Art

Strain meters of this type are well known and reference may be made to applicant's earlier Canadian Patent No. 1,240,851, issued Aug. 23, 1988. Those meters generally involve the use of a metal sleeve across the bore of which is strung a taut steel wire. The wire can be caused to vibrate by means of an electromagnetic transducer which is also housed within the sleeve. The frequency of vibration depends among other things upon the length and tightness of the wire and thus frequency can be measured by the same transducer which causes the wire to vibrate. In use, the meter is mounted securely within a hole bored within the rock formation the movement of which is to be monitored. Movement of the rock formation causes deformation of the sleeve which causes the tightness of the wire to increase or decrease and hence the vibration frequency to increase or decrease. The frequency which is displayed on a remote readout unit is, therefore, a measure of the strain.

Another form of known radial borehole deformation monitoring unit uses metal foil strain gauge transducers which are not recoverable once they are in place. Metal foil strain gauges suffer from problems of drift during long term monitoring because the epoxy bond is subject to shrinkage, moisture absorption, and creep from thermal expansion. In addition, the resistance of the readout cable, varying with length, directly affects the signal output.

The use of vibrating wire transducer technology overcomes the disadvantages encountered when monitoring radial borehole deformation with metal foil strain gauges. Vibrating wire transducer signals are independent of read-out cable lengths and have demonstrated long term stability.

SUMMARY OF THE INVENTION

The system consists of a sensing unit, an installation/retrieval provision and a read-out unit. Data can be obtained by manual read-out or through electronic data logging. The sensing unit has a U-shaped yoke and is fitted with a vibrating wire transducer. A magnetically coupled variable frequency oscillator determines the point of resonance for the tensioned wire. The resonant frequency is measured with a frequency counter. The sensing unit is used, typically, in boreholes between two and six inches in diameter. The unit is firmly seated in the borehole by means of a pad at one side and a positively guided wedge at the other to bring the unit in contact with diametrically opposed portions of the borehole wall. The vibrating wire may be mounted parallel or perpendicular to the arms of the U-shaped yoke. The length of the arms and the mounting of the vibrating wire determine the resolution and the range of instrument. The seating or initial pressure on the sensing unit can be varied to take advantage of the range of sensitivity of the vibrating wire for monitoring either an increase or a decrease in borehole diameter. In order to hold bearing pressures to acceptable levels on the walls of the borehole, wedge contact pressures are controlled by the magnitude of pre-stress or the size of the bearing surface.

Thus, the present invention provides an instrument for monitoring radial borehole deformation that can be easily installed and recovered and is useful for both short and long term monitoring.

The invention also provides a radial borehole strain monitoring system which exhibits high resolution an repeatability in demanding environments such as in underground mines.

Broadly stated the invention is a strain monitor for use in a rock bore to measure rock deformation. The device consists of a U-shaped yoke having a pair of parallel spaced arms and a stressed wire extending between the base of the yoke and the end of one of the arms. The arms are adapted to be positioned adjacent to the inner surfaces of the bore and are responsive to movement thereof. The invention further includes means to measure the natural frequency of vibration of the wire and, thereby, provide a measure of the strain of the rock bore adjacent the end of the arms.

BRIEF DESCRIPTION OF THE DRAWINGS

A preferred embodiment of the present invention will now be described with reference to the drawings wherein:

FIG. 2A is an isolated detailed view of the borehole wall contact of the active arm.

FIG. 2B is a sectional view of FIG. 2A as seen through line B—B.

FIG. 3 is a sectional view of FIG. 1 as seen through line A—A.

DESCRIPTION OF THE PREFERRED EMBODIMENT

Figure 1:
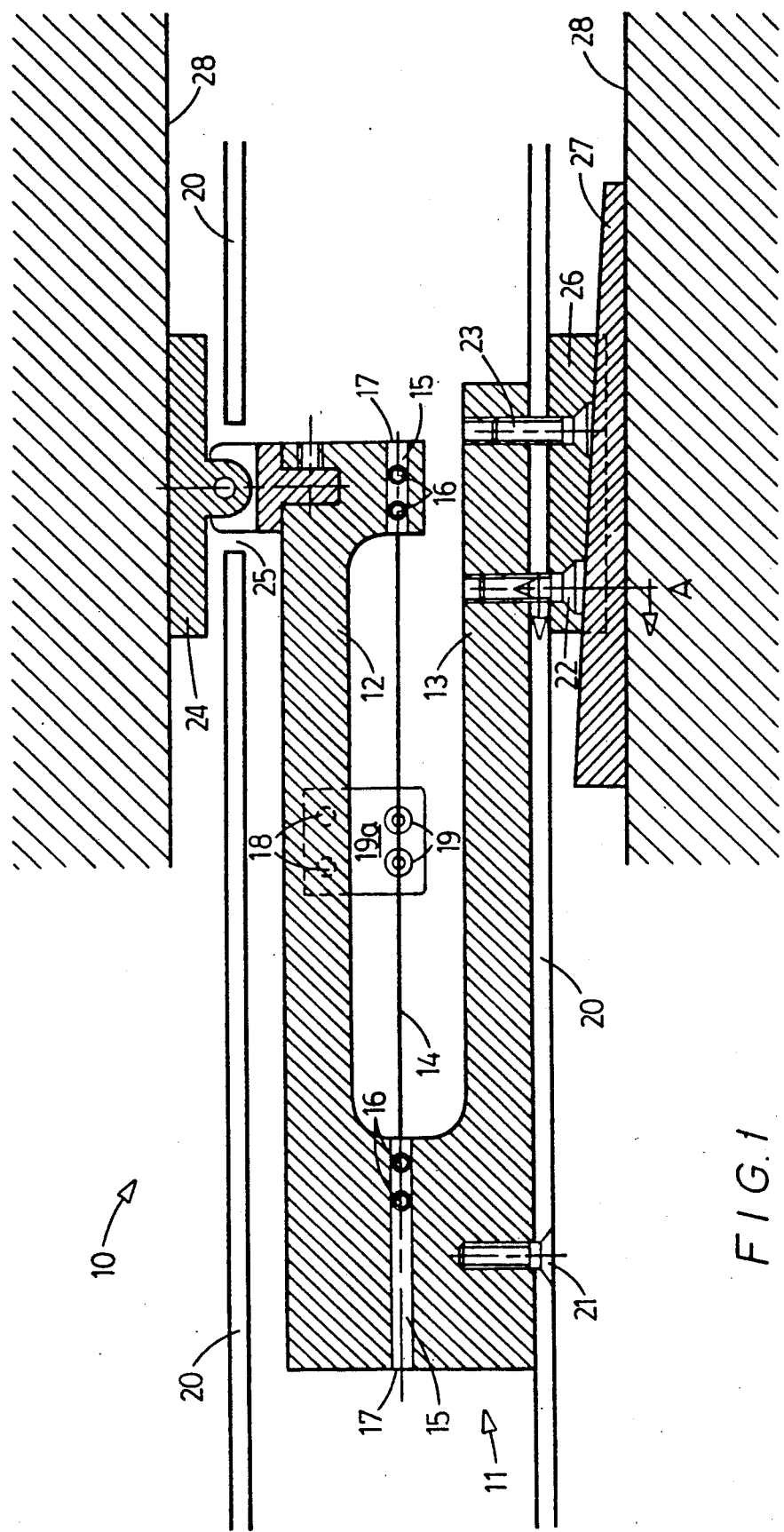
FIG. 1 is a cross-sectional view of the sensing unit in place within a borehole.

The sensing unit is shown generally as 10 in FIG. 1. The sensing unit 10 comprises a flat U-shaped yoke 11 with an active arm 12 and a passive arm 13. A tensioned steel wire 14 extends between the base of the yoke 11 and the end of active arm 12. The ends of this vibrating wire transducer 14 are fitted with slotted steel sleeves 15 mounted with set screws 16 in holes 17 of yoke 11. Magnetically coupled variable frequency oscillator 19 is mounted on plate 19a which is affixed by screws 18 to active arm 12 adjacent to wire 14. The yoke 11 is inserted in a tubular housing 20 and is anchored by set screws 21, 22 and 23 which extend into the passive arm 13. Set screws 22 and 23 also serve to affix wedge seat 26 to the exterior of housing 20. A positively guided exterior wedge 27 can then be employed to bring the sensing unit 10 in contact with borehole walls 28 across the diameter. A bore engaging pad 24 is pivotally mounted to active arm 12 through hole 25 in housing 20 on the opposite side from wedge seat 26.

FIGS. 2A, 2B and 3 illustrate the details of the borehole contacting members. Pad 24, shown in FIGS. 2A and 2B, consists of a generally rectangular metal bar 29 and a bracket 30 which are hingedly connected by pin 31. Column 32 of bracket 30 is inserted in hole 33 in active arm 12 and secured thereto by set screw 34. The second contact, shown in FIG. 3, consists of the wedge 27 and the wedge seat 26. The bar 29 and the wedge 27 have outside curved surfaces, S1 and S2, having radii of curvature slightly less than that of the borehole wall 28.

Figure 4:
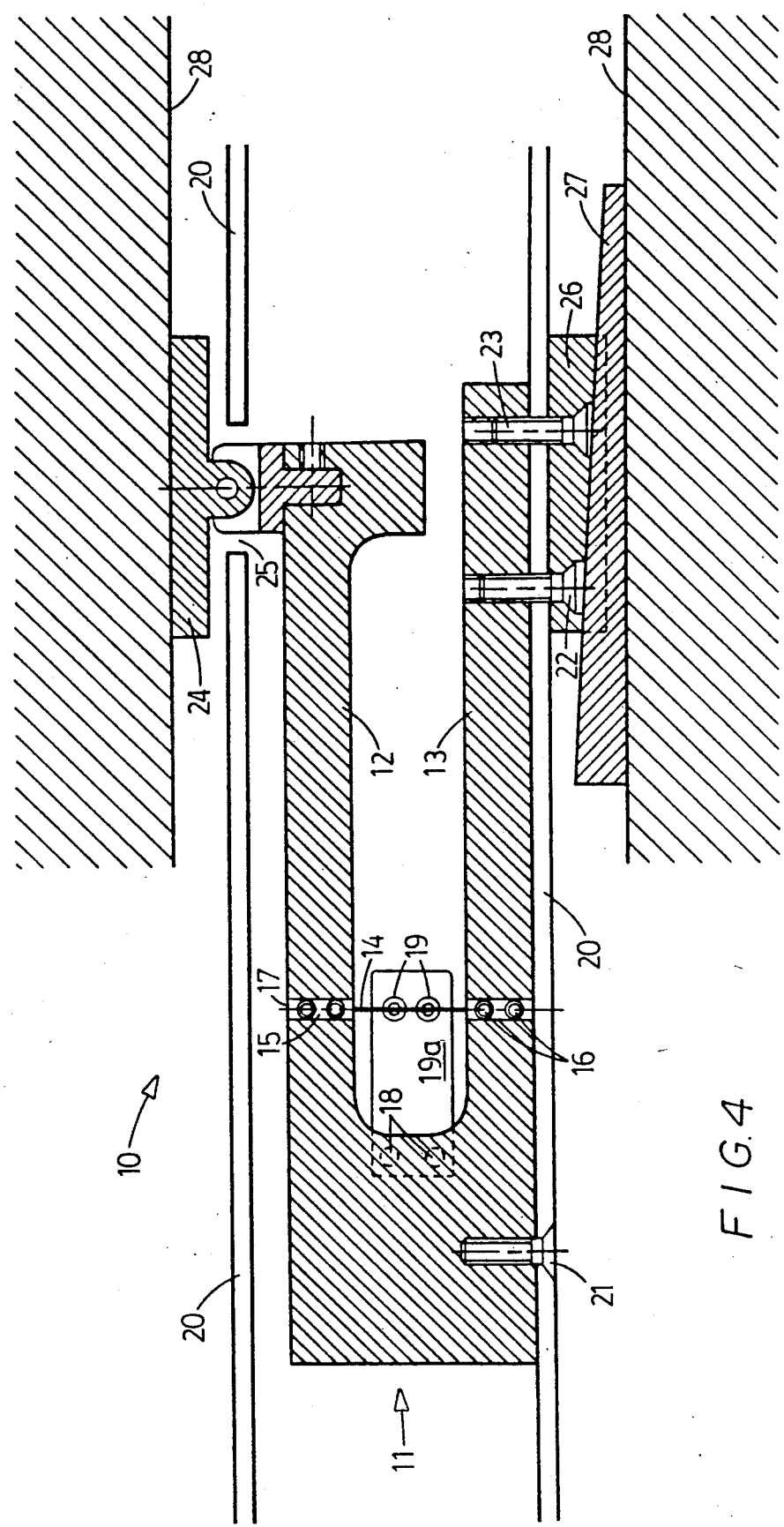
FIG. 4 is a cross-sectional view of the sensing unit which shows the vibrating wire transducer mounted transversely between the axis of the U-shaped yoke.

As shown in FIG. 4, the vibrating wire transducer 14 is mounted transversely between active arm 12 and passive arm 13. The magnetically coupled variable frequency oscillator 19 is mounted on plate 19a which is affixed by screws 18 to the base of yoke 11. The ends of the wire 14 are fitted with slotted steel sleeves is mounted with set screws 16 in holes 17 of arms 12 and 13.

In order to install the sensing unit 10 in the borehole, an installation/provision (not shown) may be mounted on the instrument housing and which may be mechanically activated to displace the wedge against the wedge seat. Only one wedge need be used during installation but a number of wedges of varying thickness are available for selection to obtain the required seating pressure in spite of borehole diameter variations. During installation the wedge 27 rests in the groove of the wedge seat 26 which has a three degree bearing surface in relation to the borehole/instrument axis. This provides for the wedge 27 to move outwardly and stay parallel to the borehole axis during installation. With a suitable borehole centering unit and rods, the assembly is pushed into the borehole to the required depth.

Application of pull to the thin end of the wedge by the installation provision will force the wedge 27 forward until the sensing unit engages opposite sides of the borehole. A further movement of wedge 27 will then apply seating pressure to the U-shaped sensor 10. During this operation, a read-out unit (not shown) is connected to the vibrating wire 14 and the amount of required seating pressure can be observed during installation. Removal of the sensing unit 10 is effected by application of pull on the instrument housing with the aid of rods or a connected wire.

The read-out unit is preferably a self-contained frequency meter which has a small dry cell battery to supply current to the oscillator and the counter. This pocket-size read-out is built from commercially available parts. For the range of wire dimensions typically used, the oscillator and counter consume about 10 mA to 25mA from a 9 V battery. With a suitable interface, readings can be obtained by electronic data acquisition systems. The data which will be in terms of frequencies (Hz), are easily converted to displacements or strains using suitable calibration curves.

The operating range of the vibrating wire sensor is chosen to optimize the resolution and the long term stability of the sensing unit. To achieve this resolution, shorter wires need to resonate at higher frequency than longer wires, which in turn, requires higher stresses on shorter wires and the generation of higher electromagnetic forces to cause the wire to vibrate. Higher stresses on the wire make clamping more difficult and may introduce creep at the clamping points. On the basis of experiments, it has been determined that the length of wire should be as long as possible in the 1 inch to 4 inch range. Typically such a wire would operate in a frequency range of 300 to 2400 Hz given a wire thickness of approximately 0.01 in. The U-shaped configuration of the sensing unit is paramount especially in small diameter bores in that it allows for the use of vibrating wires that are longer than the diameter of the boreholes, thereby minimizing creep-inducing stresses and enhancing the long term stability of the system. The vibrating wires being fitted with specially slotted steel sleeves which are mounted with set screws in the U-shaped sensor, the tension on the wire can be set as required.

The system is constructed so as to be unaffected by high moisture levels and also to resist disturbances from blasting near by. The sensing unit being mounted in a plastic or metal pipe keeps dirt and moisture out and prevents damage during installation or retrieval. The components of the sensing unit are generally fabricated from mild steel, but for corrosive environments such as in potash and salt mines, stainless steel is required at least for the components that contact the borehole walls.

What is claimed is:

1. A strain monitor for use in a rock bore to measure rock deformation comprising: a U-shaped yoke having a pair of parallel spaced arms adapted to be positioned adjacent to inner surfaces of the bore and responsive to movement thereof, a stressed wire extending between the base of the yoke and the end of one of the arms and means measuring the natural frequency of vibration of the wire, thereby to supply a measure of the strain of the rock bore adjacent the end of the arms.

2. A monitor as set out in claim 1 wherein the yoke is flat-sided and has a bore-engaging pad on one arm and a wedge seat on the other arm.

3. A monitor as set out in claim 2 wherein the bore-engaging pad is pivotally mounted on the yoke arm and the wedge seat is adapted to be engaged by an externally applied wedge to secure the monitor in the rock bore.

4. A monitor as in claim 1, wherein the wire is retained in slotted steel sleeves mounted in bores on the yoke.

5. A strain monitor for use in a rock bore to measure rock deformation, comprising:

A U-shaped yoke having an active first arm portion and a passive portion, the passive portion including a base and a second arm portion parallel to and spaced from said first arm portion, said arm portions being adapted to be positioned adjacent to the inner surfaces of a rock bore and responsive to movement thereof;

a stressed wire extending between said active first arm portion and said passive portion of said U-shaped yoke and parallel to said first and second arm portions; and means measuring the natural frequency of vibration of said wire to supply a measure of the strain of the rock bore adjacent said arms.

6. A monitor as set out in claim 5, wherein said yoke passive portion includes a base, and wherein said first and second arm portions extend from said base to form free ends of said arms.

7. A monitor as set out in claim 6, wherein said stressed wire extends from said active first arm portion to said yoke base.

8. A monitor as set out in claim 6, wherein said stressed wire extends from the free end of said active first arm portion to said yoke base.

9. A monitor as set out in claim 6, wherein said passive portion includes means for securing said monitor to a rock bore.

10. A monitor as set out in claim 9, wherein said active first arm portion includes a bore-engaging pad.

* * * * *